United States Patent [19]
Hara

[11] Patent Number: 6,113,380
[45] Date of Patent: Sep. 5, 2000

[54] BACK FLOW-PREVENTION APPARATUS

[75] Inventor: Hitoshi Hara, Funabashi, Japan

[73] Assignee: Sumitomo Heavy Industries, Ltd., Japan

[21] Appl. No.: 09/124,982

[22] Filed: Jul. 30, 1998

[30] Foreign Application Priority Data

May 22, 1998 [JP] Japan ................................. 10-141307

[51] Int. Cl.[7] ...................................................... A23P 1/00
[52] U.S. Cl. ............................................ 425/559; 425/563
[58] Field of Search ..................................... 425/557, 559, 425/563

[56] References Cited

U.S. PATENT DOCUMENTS 5,441,400 8/1995 Zeiger ...................................... 425/562

*Primary Examiner*—Tim Heitbrink
*Attorney, Agent, or Firm*—Lorusso & Loud

[57] ABSTRACT

A back-flow prevention apparatus is composed of a screw and a platelike closing member. The screw includes at least a metering portion having a groove formed thereon for advancing a resin. The closing member is brought into an open position state by resin pressure which is developed behind the closing member in association with metering, thereby establishing communication between the groove and a space located ahead of the screw. The closing member is brought into a closed position by a restoring force of an elastic material, thereby shutting off communication between the groove and the space located ahead of the screw. Upon completion of a metering step, the restoring force brings the closed position into the closing state to thereby shut off communication between the groove and the space located ahead of the screw. Accordingly, sealing can be completed before the start of an injection step. Further, since timing for shutting off communication between the groove and the space located ahead of the screw does not vary, not only can the amount of resin charged into a mold cavity be stabilized, but also variation in injection peak pressure can be suppressed. As a result, molded products can be prevented from suffering burrs, short shot, or like defects. Also, variation in weight among molded products can be suppressed.

18 Claims, 6 Drawing Sheets

BACK FLOW-PREVENTION APPARATUS

BACKGROUND OF THE INVENTION

1. Field of the Invention

The present invention relates to a back-flow prevention apparatus.

2. Description of the Related Art

Conventionally, an injection molding machine includes an injection having a heating cylinder in which a screw is disposed rotatably and in an advancingly-retreatively movable manner. Drive means rotates and advances or retreats the screw. In a metering step, the screw is retreated while being rotated, so that resin is dropped from a hopper, melted and accumulated in a space located ahead of the screw. In an injection step, the screw is advanced so as to inject the resin melt into a mold from an injection nozzle.

FIG. 1 shows a sectional view of a main portion of a conventional injection unit.

In FIG. 1, reference numeral 11 denotes a heating cylinder. The heating cylinder 11 has an injection nozzle 13 at its front end (left-hand end in FIG. 1). In the heating cylinder 11, a screw 12 is disposed rotatably and in an advancingly-retreatively movable manner. Unillustrated drive means rotates and advances or retreats the screw 12. Notably, an injection cylinder, a motor, or a like device normally serves as the drive means.

The screw 12 extends rearward (to the right in FIG. 1) within the heating cylinder 11. The screw 12 is connected at its rear end to the drive means and has a screw head 14 at its front end. A spiral flight 15 is formed on the surface of a metering portion 18 of the screw 12 to thereby form a groove 16 along the flight 15.

An unillustrated hopper is disposed at a predetermined position located at a rear portion of the heating cylinder 11. Resin pellets are charged into the hopper.

In the thus-configured injection unit, in a metering step, the drive means causes the screw 12 to rotate and retreat. Resin pellets contained in the hopper drop into the heating cylinder 11 and are advanced (to the left in FIG. 1) through the groove 16.

An unillustrated heater is disposed around the outer circumference of the heating cylinder 11. The heater heats the heating cylinder 11 so as to melt resin pellets contained in the groove 16. Accordingly, when the screw 12 is retreated by a predetermined amount while being rotated, a predetermined amount of resin melt to be injected is stored in a space located ahead of the screw 12.

Upon completion of the metering step, suck-back is performed, i.e., the screw 12 is slightly retreated without being rotated, to thereby prevent the resin from oozing from the front end of the injection nozzle 13.

Next, in an injection step, the drive means is activated so as to advance the screw 12. The resin stored in the space located ahead of the screw 12 is injected into an unillustrated mold cavity from the injection nozzle 13, thereby filling the cavity with the resin.

In order to prevent backflow of the resin stored in the space located ahead of the screw 12 in the injection step, a back-flow prevention device is provided.

Specifically, the screw head 14 has a conical head body portion 21 formed at its front section and a small-diameter portion 19 formed at its rear section. The small-diameter portion 19 has an unillustrated external thread which extends rearward. The external thread is engaged with an unillustrated internal thread formed in a front end portion of the screw 12 so as to fixedly engage the screw head 14 with the screw 12. An annular back-flow prevention ring 20 is disposed around the circumference of the small-diameter portion 19, thereby defining a resin passageway 24 between the small-diameter portion 19 and the back-flow prevention ring 20. A seal ring 22 is disposed at the front end of the metering portion 18 such that the seal ring 22 can contact or separate from the rear end of the back-flow prevention ring 20.

Accordingly, in the injection step, when the screw 12 is advanced, the resin stored in the space located ahead of the screw 12 is urged to move rearward. However, resin pressure causes the back-flow prevention ring 20 to move rearward with respect to the screw 12. Thus, the rear end of the back-flow prevention ring 20 abuts the seal ring 22 to thereby effect sealing. As a result, the resin stored in the space located ahead of the screw 12 is prevented from flowing rearward.

In contrast, in the metering step, when the screw 12 is retreated while being rotated, resin pressure causes the back-flow prevention ring 20 to move forward with respect to the screw 12. Thus, the front end of the back-flow prevention ring 20 abuts the rear end of the head body portion 21. Since axially extending cuts 25 are formed in the head body portion 21 in a plurality of circumferential positions, resin flow is not hindered.

The conventional back-flow prevention apparatus effects sealing in the injection step through advancing the screw 12 so as to bring the rear end of the back-flow prevention ring 20 into contact with the seal ring 22. Accordingly, the resin flows rearward in an amount corresponding to an advancement of the screw 12 effected before sealing is completed.

Further, in order for a sufficient amount of resin to flow into the resin passageway 24 from the space defined between the back-flow prevention ring 20 and the seal ring 22, the small-diameter portion 19 is made sufficiently long as compared to the back-flow prevention ring 20. Thus, the amount of movement of the back-flow prevention ring 20 for effecting sealing increases accordingly, resulting in an increase in the amount of back-flow resin.

Also, timing for completion of sealing varies depending on the state of kneading and dispersion of resin, resin viscosity, resin temperature, etc., and molding conditions for setting the acceleration to a predetermined injection speed at the time of starting injection, or even under the same molding conditions.

Accordingly, the quantity of back-flow resin varies; consequently, an injection peak pressure varies. As a result, molded products suffer short shot, burrs, or like defects.

Further, when the metering step is started, cancellation or breakage of sealing requires a relatively long time, and excess heat is generated due to plasticization of resin.

Thus, there is provided a back-flow prevention apparatus in which the screw 12 is once rotated in a reverse direction upon completion of the metering step so as to bring the rear end of the back-flow prevention ring 20 into contact with the seal ring 22 to thereby effect sealing.

However, this type of back-flow prevention apparatus requires a mechanism for bringing the rear end of the back-flow prevention ring 20 into contact with the seal ring 22. This not only complicates the structure of the screw head 14 but also involves an additional reverse rotation of the screw 12, making control of the drive means complicated.

To cope with the above-mentioned problems, there is provided a back-flow prevention apparatus using a ball check type check valve.

FIG. 2 shows a back-flow prevention apparatus using a ball check type check valve.

In FIG. 2, reference numeral 11 denotes a heating cylinder, and numeral 32 denotes a screw. The screw 32 includes a metering portion 33 and a screw head 34. The screw head 34 is screw-engaged to the metering portion 33 and its outer diameter is equal to that of the metering portion 33. The screw 32 extends rearward (to the right in FIG. 2) within the heating cylinder 11. A spiral flight 35 is formed on the surface of the metering portion 33 to thereby form a groove 36 along the flight 35.

The screw head 34 has a resin passageway 41 and a valve chamber 43 formed therein. The resin passageway 41 opens at its front end (the left end in FIG. 2), extends rearward, and communicates at its rear end with the valve chamber 43. The metering portion 33 has a resin passageway 46 and resin passageways 47 formed therein. The resin passageway 46 opens at its front end and extends rearward. The resin passageways 47 establish communication between the resin passageway 46 and the groove 36. A valve seat 45 is formed at the front end of the resin passageway 46. A ball 49 serving as a check valve is pressed against the valve seat 45 by an urging force of a coil spring 50.

In the thus-configured back-flow prevention apparatus, in a metering step, unillustrated drive means causes the screw 32 to rotate and retreat. Resin pressure causes the ball 49 to advance (move to the left in FIG. 2) against the urging force of the coil spring 50. Accordingly, resin advanced through the groove 36 passes sequentially through the resin passageways 47 and 46, the valve chamber 43, and the resin passageway 41 and is then stored in a space located ahead of the screw 32.

Subsequently, in an injection step, when the screw 32 is advanced, the resin stored in the space located ahead of the screw 32 is urged to flow rearward. However, the urging force of the coil spring 50 causes the ball 49 to be pressed against the valve seat 45, thereby effecting sealing. As a result, the resin stored in the space located ahead of the screw 32 is prevented from flowing rearward.

Accordingly, the time required for charging becomes shorter, so that resin temperature is prevented from dropping and resin viscosity is prevented from increasing during the charging. Also, since the screw head 34 does not include a small-diameter portion, potential breakage of the screw head 34 can be prevented in an initial state of molding in which resin begins to plasticize.

Also, upon start of the metering step, breakage of sealing is completed promptly, so that excess heat is not generated due to plasticization of resin.

However, since the coil spring 50 is used for effecting sealing, not only is a relatively large stress borne by the coil spring 50, but also the coil spring 50 comes into contact with high-temperature high-pressure resin. Accordingly, the coil spring 50 deteriorates in a relatively short period of time, resulting in reduced durability of the back-flow prevention apparatus. Further, since the resin passageways 41, 46, and 47 are narrow and in a complicated form, shearing heat is generated while resin flows through the resin passageways 41, 46, and 47.

SUMMARY OF THE INVENTION

An object of the present invention is to solve the above-mentioned problems in the conventional back-flow prevention apparatus and to provide a back-flow prevention apparatus capable of preventing molded products from suffering burrs, short shot, or like defects, suppressing generation of excess heat and shearing heat, and enhancing durability.

To achieve the above objects, a back-flow prevention apparatus of the present invention comprises a screw and a platelike closing member. The screw includes at least a metering portion having a groove formed thereon for advancing a resin.

The closing member is brought to an open position by resin pressure which is developed behind the closing member in association with metering, thereby establishing communication between the groove and a space located ahead of the screw. The closing member is brought to a closed position by a restoring force of an elastic member, thereby shutting off communication between the groove and the space located ahead of the screw.

In this case, upon completion of a metering step, the restoring force brings the closing member into the closed position to thereby shut off communication between the groove and the space located ahead of the screw. Accordingly, sealing can be completed before an injection step is started. Further, since timing for shutting off communication between the groove and the space located ahead of the screw does not vary, not only can the amount of resin charged into a mold cavity be stabilized, but also variation in injection peak pressure can be suppressed. As a result, molded products can be prevented from suffering burrs, short shot, or like defects. Also, variation in weight among molded products can be reduced.

At the time of suck-back, the screw may be retreated merely about one-third a conventional amount in order to decrease pressure around an injection nozzle to a sufficiently low value for preventing resin from oozing from the injection nozzle. Thus, there can be satisfactorily suppressed the entry of air into an injection unit associated with suck-back.

Further, since the resin pressure in the space located ahead of the screw can be increased to a sufficiently high level in about several tens of microseconds after the start of the injection step, the charging time is reduced. Thus, during the injection step, resin temperature is less likely to drop, and resin viscosity is less likely to increase.

Also, since breakage of sealing is completed promptly upon start of the metering step, excess heat is not generated due to plasticization of resin.

Further, since the closing member is a plate, stress induced in the closing member can be reduced. Accordingly, the closing member can be prevented from deteriorating in a short period of time, thereby enhancing durability of the back-flow prevention apparatus.

In another back-flow prevention apparatus according to the present invention, the closing member is disposed on an end surface of the metering portion.

In this case, being supported by the metering portion, the closing member is not deformed by resin pressure developed during the injection step. Accordingly, durability of the back-flow prevention apparatus can be enhanced. Also, since a resin passageway can be not only expanded but also simplified, shearing heat is not generated while resin flows through the resin passageway, thereby improving color changeover performance.

In still another back-flow prevention apparatus according to the present invention, a screw head having the platelike closing member is attached onto the front end of the metering portion.

In still another back-flow prevention apparatus according to the present invention, the closing member is at least partially formed of an elastic material and includes a shut-off portion and an urging support portion. The shut-off portion is formed between the groove and the space located ahead of the screw. The urging support portion is integrated with the shut-off portion and adapted to urge the shut-off portion toward the closed position.

In still another back-flow prevention apparatus according to the present invention, the closing member is entirely formed of an elastic material.

In still another back-flow prevention apparatus according to the present invention, the closing member is a leaf spring.

In still another back-flow prevention apparatus according to the present invention, in the closed position, the closing member covers a resin passageway hole formed in the front end of the metering portion.

In still another back-flow prevention apparatus according to the present invention, in the closed position, the closing member covers a groove at the front end of the metering portion.

In still another back-flow prevention apparatus according to the present invention, in the closed position, the closing member covers a resin passageway hole formed in the front end of the screw head.

In still another back-flow prevention apparatus according to the present invention, the screw head includes a seal portion for establishing sealing between the groove and the space located ahead of the screw at a position located behind the closing member.

In still another back-flow prevention apparatus according to the present invention, the screw head comprises a head body and a seal ring. The head body includes a fitting portion. The seal ring is fit onto the fitting portion and serves as the seal portion. Also, a gap of 10 $\mu$ to 0.5 mm is formed in an axial direction between the seal ring and the head body.

In this case, the gap absorbs any deviation of the screw which arises as the screw is advanced in the injection step. Also, after such a deviation is absorbed, the seal ring restricts further deviation of the screw. Accordingly, there can be suppressed galling which would otherwise result from the screw being pressed against the inner wall of the heating cylinder. Further, there can be suppressed wear which would otherwise occur on the outer circumferential portion of the screw head.

In still another back-flow prevention apparatus according to the present invention, the tempering temperature of the elastic material is 400° C. or higher.

Since the closing member is resistant to high-temperature resin to thereby be free from deterioration, durability of the back-flow prevention apparatus is enhanced.

In still another back-flow prevention apparatus according to the present invention, a labyrinth is formed in the outer surface of the seal portion.

The labyrinth enables smooth sliding between the seal portion and the inner wall of a heating cylinder.

BRIEF DESCRIPTION OF THE DRAWINGS

The structure and features of the back-flow prevention apparatus according to the present invention will be readily appreciated as the same become better understood by referring to the drawings, in which.

DESCRIPTION OF THE PREFERRED EMBODIMENTS

Embodiments of the present invention will next be described in detail with reference to the drawings.

Figure 1:
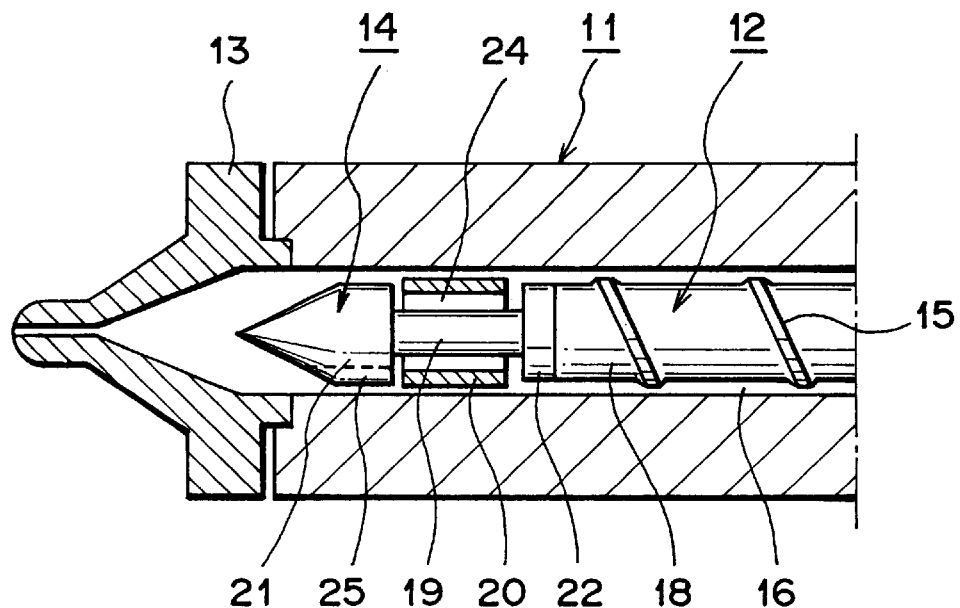
FIG. 1 is a sectional view of a main portion of a conventional injection unit.
Figure 2:
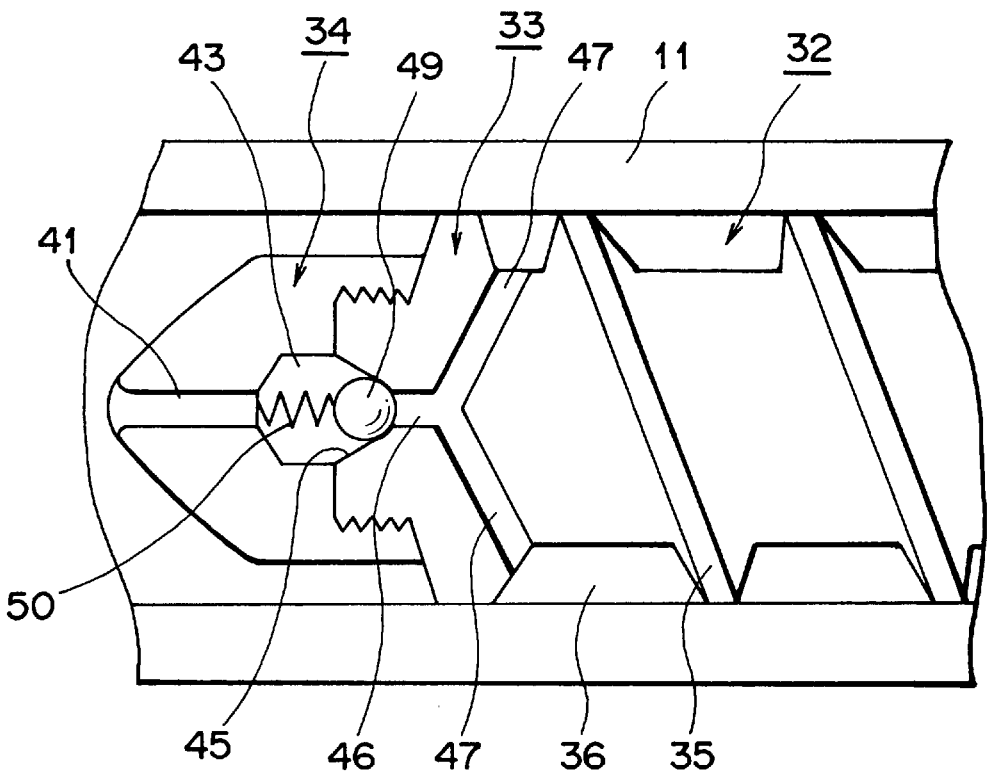
FIG. 2 is a schematic view of a conventional back-flow prevention apparatus using a ball check type check valve.
Figure 3:
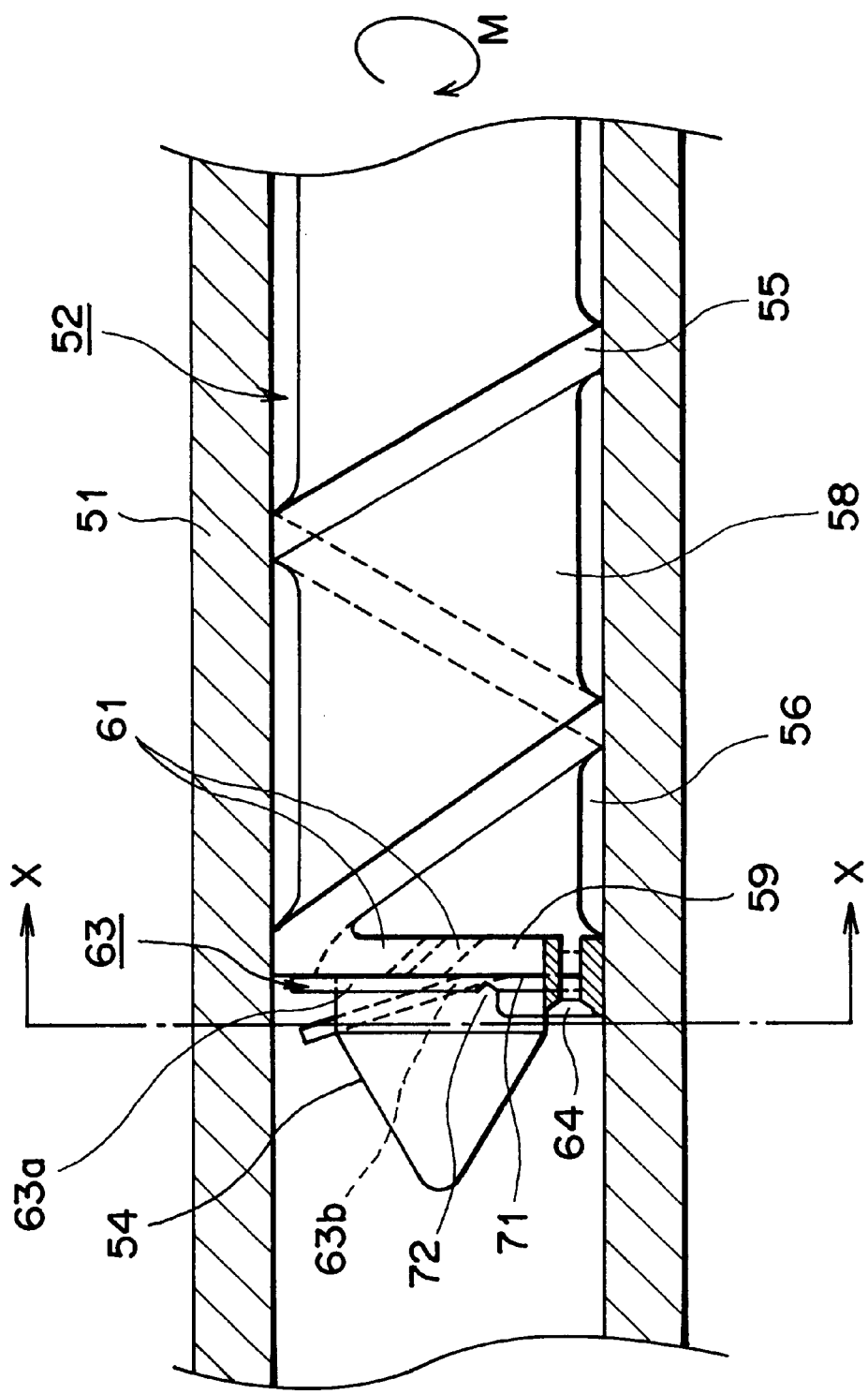
FIG. 3 is a schematic view of a back-flow prevention apparatus according to a first embodiment of the present invention.
Figure 4:
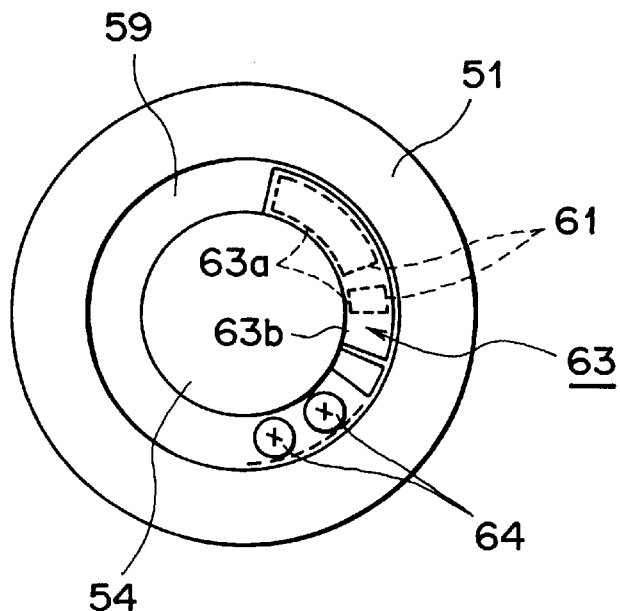
FIG. 4 is a sectional view taken along the line X—X of FIG. 3.

FIG. 3 schematically shows a back-flow prevention apparatus according to a first embodiment of the present invention. FIG. 4 is a sectional view taken along the line X—X of FIG. 3.

In FIGS. 3 and 4, reference numeral 51 denotes a heating cylinder. The heating cylinder 51 has an unillustrated injection nozzle at its front end (at the left end in FIG. 3). In the heating cylinder 51, a screw 52 is disposed rotatably and in an advancingly-retreatively movable manner. Unillustrated drive means rotates and advances or retreats the screw 52. Notably, an injection cylinder, a motor, or a like device normally serves as the drive means.

The screw 52 extends rearward (to the right in FIG. 3) within the heating cylinder 51. The screw 52 is connected at its rear end to the drive means and has a screw head 54 and a metering portion 58. In this case, an unillustrated external thread is formed at a rear end portion of the screw head 54. The external thread is engaged with an unillustrated internal thread formed in a front end portion of the metering portion 58 so as to fixedly attach the screw head 54 to the metering portion 58. Notably, the screw head 54 and the metering portion 58 may be integrally formed.

A spiral flight 55 is formed on the surface of the metering portion 58 to thereby form a groove 56 along the flight 55.

An unillustrated hopper is disposed at a predetermined position located at a rear portion of the heating cylinder 51. Resin pellets are charged into the hopper. A seal portion 59 has an outer diameter equal to that of the flight 55 and is formed at the front end of the metering portion 58 along an outer circumferential edge of the metering portion 58. Notably, an unillustrated seal ring may be attached, as needed, onto the front end of the metering portion 58.

At least one fan-shaped resin passageway hole 61 is formed in the seal portion 59 at a predetermined circumferential position for the purpose of establishing communication between the groove 56 and a space located ahead of the seal portion 59. In order to cover the resin passageway hole 61, a fan-shaped leaf spring 63 serving as a closing member is disposed on the front end of the metering portion 58. One end of the leaf spring 63 is fixed onto the seal portion 59 by means of screws 64. A groove 71 is formed in the seal portion 59 so as to receive the one end of the leaf spring 63.

The leaf spring 63 includes a shut-off portion 63a and an urging support portion 63b. The shut-off portion 63a is located between the metering portion 58 and the space located ahead of the screw 52 and is formed so as to correspond to the resin passageway hole 61. The urging support portion 63b is integrated with the shut-off portion 63a and adapted to urge the shut-off portion 63a toward the closed position. In the present embodiment, the leaf spring 63 is used as the platelike closing member, and both the shut-off portion 63a and the urging support portion 63b are formed of an elastic material. However, the closing member may be at least partially formed of an elastic material. In this case, only the urging support portion 63b is formed of an elastic material, while the shut-off portion 63a is formed of a nonelastic material.

Accordingly, the leaf spring 63 is normally in its closed position as represented with the solid line of FIG. 3 to thereby directly shut off communication between the groove 56 and the space located ahead of the screw 52. When resin pressure in the groove 56 becomes higher than that in the space located ahead of the screw 52, the leaf spring 63 bends and is move to its open position as represented with the dashed line of FIG. 3 to thereby establish communication between the groove 56 and the space located ahead of the screw 52.

Resins other than special high-temperature resins normally have a melting point of 200° C. to 380° C. Thus, an elastic material having a tempering temperature higher than the melting point of resin, for example, a tempering temperature of 400° C. or higher, is selected as the above-mentioned elastic material for the closing member, so that the elastic material retains elasticity even in the presence of a high-temperature resin. In the present embodiment, Inconel having a tempering temperature of 514° C. or higher is used as the elastic material. For an injection molding machine which handles a resin having a relatively high melting point, the leaf plate 63 may be formed of zirconia ceramic or a like elastic material.

Through use of the leaf spring 63 as described above, stress induced in the leaf spring 63 can be made relatively small. Also, through use of the elastic material having a tempering temperature higher than the melting point of resin, the leaf spring 63 can be prevented from deteriorating in a short period of time, thereby enhancing durability of the back-flow prevention apparatus. Further, since the leaf spring 63 directly shuts off communication between the groove 56 and the space located ahead of the screw 52, responsiveness of the back-flow prevention apparatus can be enhanced.

In order to facilitate bending of the leaf spring 63, a concave portion or groove 72 is formed in the leaf spring 63 adjacent to a portion of the leaf spring 63 fixed by means of the screws 64.

In the thus-configured back-flow prevention apparatus, in a metering step, the drive means causes the screw 52 to rotate in the direction of arrow M and retreat. Resin pellets contained in the hopper drop into the heating cylinder 51 and are advanced through the groove 56.

An unillustrated heater is disposed around the outer circumference of the heating cylinder 51 and serves to heat the heating cylinder 51. Accordingly, resin pellets are melted while being advanced through the groove 56. The resin melt passes through the resin passageway hole 61 and causes the leaf spring 63 to bend and thus brings the leaf spring 63 to its open position. Thus, the resin melt flows out into a space located ahead of the seal portion 59. Accordingly, when the screw 52 is retreated by a predetermined amount while being rotated, a predetermined amount of resin melt to be injected is stored in a space located ahead of the screw 52.

Upon completion of the metering step, the screw 52 is caused to stop rotating. At this time, resin pressure in the groove 56 drops and becomes substantially equal to that in the space located ahead of the screw 52. Accordingly, the leaf spring 63 is restored to its closed position by a restoring force of the urging support portion 63b. Thus, the leaf spring 63 closes the resin passageway hole 61 to thereby effect sealing.

In order to prevent the resin from oozing from the front end of the injection nozzle, suck-back is performed, i.e., the screw 52 is retreated a short distance without being rotated.

Next, in an injection step, the drive means is activated so as to advance the screw 52. The resin stored in the space located ahead of the screw 52 is injected into an unillustrated mold cavity from the injection nozzle, thereby filling the cavity. At this time, the resin stored in the space located ahead of the screw 52 is urged to flow rearward. However, the leaf spring 63 is already in the closed position, and thus the resin passageway hole 61 is closed, thereby preventing rearward flow of the resin stored in the space located ahead of the screw 52.

As described above, before the start of the injection step, the leaf spring 63 is in the closed position for sealing. That is, timing for completion of sealing does not vary. Accordingly, not only can the amount of resin charged into a mold cavity be stabilized, but also a molded product can be prevented from suffering burrs.

Further, since the resin pressure in the space located ahead of the screw 52 can be increased to a sufficiently high level in about several tens of microseconds after the start of the injection step, the charging time is reduced. Thus, during the injection step, resin temperature is less likely to drop, and resin viscosity is less likely to increase. Also, since the screw head 54 does not include a small-diameter portion, potential breakage in the screw head 54 can be prevented.

Being supported by the seal portion 59, the leaf spring 63 is not deformed by resin pressure developed during the injection step. Accordingly, durability of the back-flow prevention apparatus can be enhanced. Also, since the resin passageway hole 61 can be not only expanded but also simplified, shearing heat is not generated while resin flows through the resin passageway hole 61, thereby improving color changeover performance.

Further, since breakage of sealing is completed promptly upon start of the metering step, excess heat is not generated due to plasticization of resin.

Next, a second embodiment of the present invention will be described.

Figure 5:
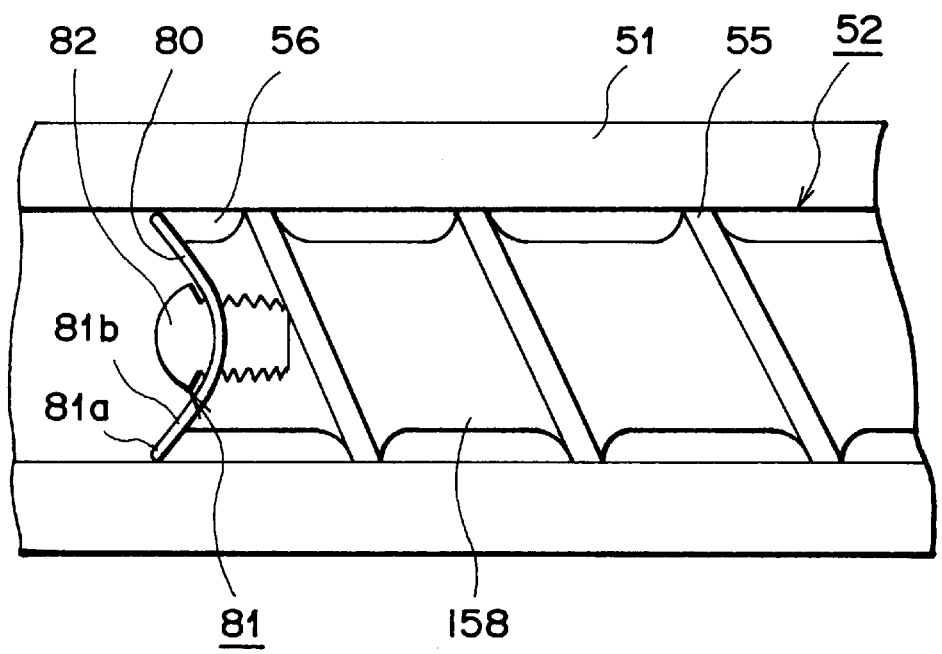
FIG. 5 is a schematic view of a back-flow prevention apparatus according to a second embodiment of the present invention.

FIG. 5 schematically shows a back-flow prevention apparatus according to the second embodiment. In FIG. 5, the same features as those of the first embodiment are denoted by common reference numerals, and their description is omitted.

In this case, a concave surface 80 is formed on the front end of a metering portion 158 of a screw 52. A concave leaf spring 81 serving as a platelike closing member is attached onto the concave 80. A urging support portion 81b of the leaf spring 81 is fixedly attached onto the metering portion 158 by means of a screw 82. A shut-off portion 81a formed along the circumferential edge of the leaf spring 81 covers a groove 56 at the front end of the metering portion 158.

In the thus-configured back-flow prevention apparatus, in a metering step, unillustrated drive means causes the screw 52 to rotate and retreat. Resin is melted while being advanced through the groove 56. The resin melt causes the leaf spring 81 to bend and thus moves the leaf spring 81 to its open position. The resin melt passes through the gap between the shut-off portion 81a and a heating cylinder 51, thereby flowing out into a space located ahead of the leaf spring 81. Thus, a required amount of the resin melt to be injected is stored in a space located ahead of the screw 52. Notably, the leaf spring 81 is adapted such that its circumferential edge is flared when in the open position.

Upon completion of the metering step, the screw 52 is caused to stop rotating. At this time, resin pressure in the groove 56 drops and becomes substantially equal to that in the space located ahead of the screw 52. Accordingly, the leaf spring 81 is restored to its closed position by a restoring force of the urging support portion of 81b, thereby effecting sealing.

Next, a third embodiment of the present invention will be described.

Figure 6:
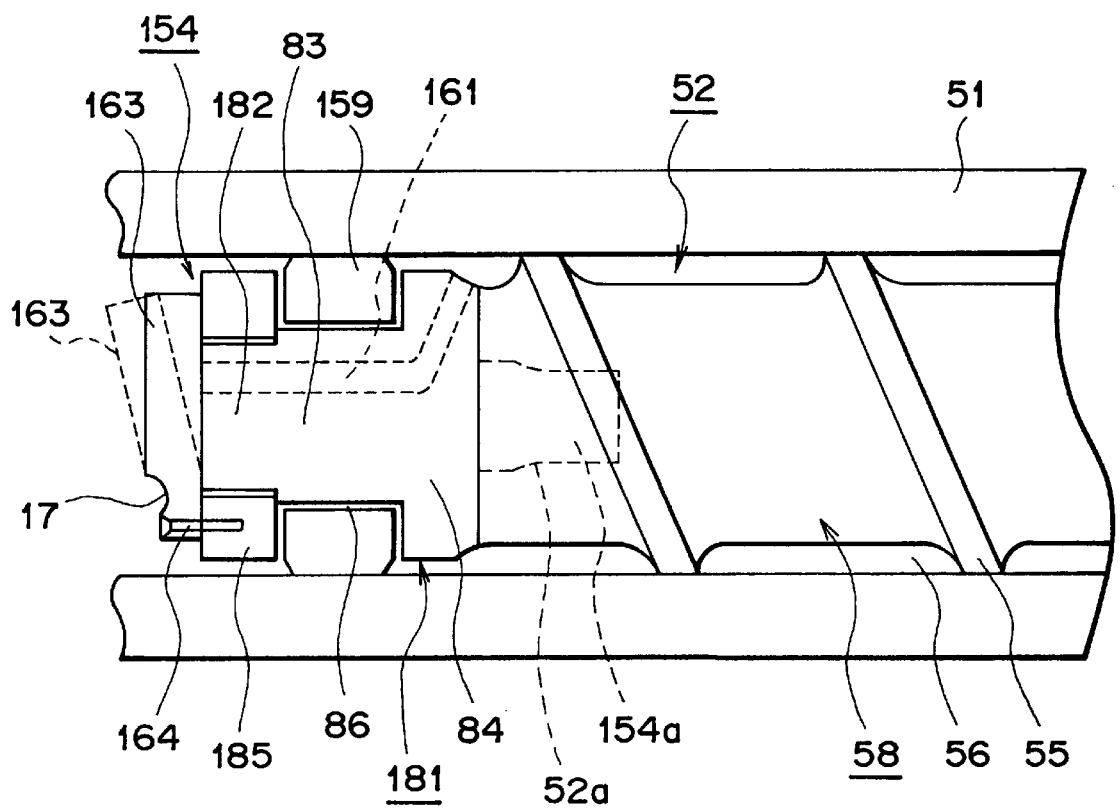
FIG. 6 is a schematic view of a back-flow prevention apparatus according to a third embodiment of the present invention.
Figure 7:
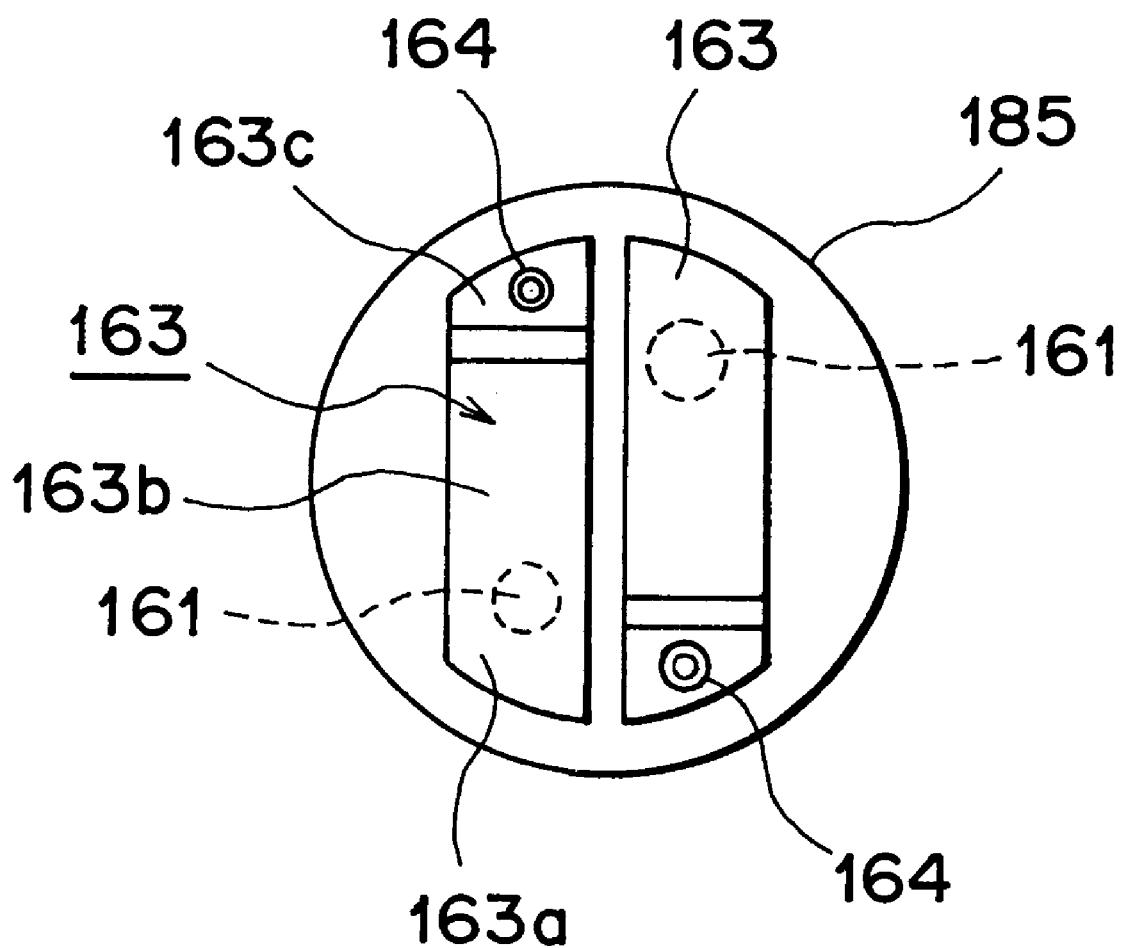
FIG. 7 is a front view of a main portion of the back-flow prevention apparatus according to the third embodiment of the present invention.

FIG. 6 schematically shows a back-flow prevention apparatus according to the third embodiment. FIG. 7 is a front view showing a main portion of the back-flow prevention apparatus according to the third embodiment.

In FIGS. 6 and 7, reference numeral 51 denotes a heating cylinder. The heating cylinder 51 has an unillustrated injection nozzle at its front end (at the left end in FIG. 6). In the heating cylinder 51, a screw 52 is disposed rotatably and in an advancingly-retreatively movable manner. Unillustrated drive means rotates and advances or retreats the screw 52. Notably, an injection cylinder, a motor, or a like device normally serves as the drive means.

The screw 52 extends rearward (to the right in FIG. 6) within the heating cylinder 51. The screw 52 is connected at its rear end to the drive means and has a screw head 154 and a metering portion 58. An external thread 154a is formed at a rear end portion of the screw head 154. The external thread 154a is engaged with an internal thread 52a formed in a front end portion of the metering portion 58 so as to fixedly attach the screw head 154 to the metering portion 58. Notably, the screw head 154 and the metering portion 58 may be integrally formed.

A spiral flight 55 is formed on the surface of the metering portion 58 to thereby form a groove 56 along the flight 55.

An unillustrated hopper is disposed at a predetermined position located at a rear portion of the heating cylinder 51. Resin pellets are charged into the hopper.

The screw head 154 includes a head body 181, a seal ring 159, an annular stopper 185, and a pair of leaf springs 163. The seal ring 159 is mounted on the head body 181 at the center thereof, and is slidably movable on the inner wall of the heating cylinder 51 to thereby serve as a seal portion for sealing the groove 56 against a space located ahead of the screw 52. The stopper 185 is located ahead of the seal ring 159 so as to prevent the seal ring 159 from coming off. The leaf springs 163 are disposed on the front end of the head body 181 and serve as platelike closing members. The head portion 181 includes a small-diameter screw-engagement portion 182 located at its front end portion, an intermediate-diameter fitting portion 83 located at its central portion, and a large-diameter flange portion 84 located at its rear end portion. The stopper 185 is screw-engaged onto the screw-engagement portion 182. The seal ring 159 is fit onto the fitting portion 83. After the seal ring 159 is fit onto the fitting portion 83, the stopper 185 is screw-engaged onto the screw-fitting portion 182, thereby securing the seal ring 159 to the head body 181. Notably, a small gap 86 is formed axially between the seal ring 159 and the stopper 185, radially between the seal ring 159 and the fitting portion 83, and axially between the seal ring 159 and the flange portion 84, thereby preventing occurrence of wear which would otherwise result from friction between the seal ring 159 and the head body 181 associated with rotation of the screw 52. The total amount of the radial gaps 86 is not less than 0.2 mm. The total amount of the axial front gap 86 and the axial rear gap 86 is 10 μ to 0.5 mm, preferably 50 82 to 0.2 mm.

Resin passageway holes 161 are formed in the head body 181 at two circumferentially spaced positions for the purpose of establishing communication between the groove 56 and a space located ahead of the screw 52. Each resin passageway hole 161 opens toward the metering portion 58 at a circumferential edge section of the flange portion 84, extends obliquely inwardly in the flange portion 84, extends forward in the fitting portion 83 and the screw-engagement portion 182, and then opens toward a space located ahead of the head body 181 at the front end surface of the screw-engagement portion 182. In order to cover the resin passageway holes 161, the leaf springs 163 are disposed on the front end surface of the screw-engagement portion 182 and fixedly attached onto the stopper 185 such that one end of each leaf spring 163 is fixedly attached onto the stopper 185 by means of a screw 164.

The leaf spring 163 includes a shut-off portion 163a, an urging support portion 163b, and a stationary portion 163c. The shut-off portion 163a is formed so as to correspond to the resin passageway hole 161. The urging support portion 163b is integrated with the shut-off portion 163a and adapted to urge the shut-off portion 163a toward a closed position. The stationary portion 163c is integrated with the urging support portion 163b and adapted to fixedly attach the leaf spring 163 onto the stopper 185. In the present embodiment, the leaf spring 163 is used as the platelike closing member, and the shut-off portion 163a, the urging support portion 163b, and the stationary portion 163c are all formed of an elastic material. However, the closing member may be at least partially formed of an elastic material. In this case, only the urging support portion 163b is formed of an elastic material, while the shut-off portion 163a and the stationary portion 163c are formed of a nonelastic material. In order to facilitate bending of the leaf spring 163, a concave portion or groove 17 is formed in the leaf spring 163 at a position between the urging support portion 163b and the stationary portion 163c.

Accordingly, each leaf spring 163 is normally in the closed position as represented with the solid line of FIG. 6 to thereby directly shut off communication between the groove 56 and the space located ahead of the screw 52. When resin pressure in the groove 56 becomes higher than that in the space located ahead of the screw 52, the leaf spring 163 bends and is moved to the open position as represented with the dashed line of FIG. 6 to thereby establish communication between the groove 56 and the space located ahead of the screw 52.

Resins other than special high-temperature resins normally have a melting point of 200° C. to 380° C. Thus, an elastic material having a tempering temperature higher than the melting point of resin, for example, a tempering temperature of 400° C. or higher, is selected as the above-mentioned elastic material for the closing member, so that the elastic material retains elasticity even in the presence of a high-temperature resin. In the present embodiment, Inconel having a tempering temperature of 514° C. or higher is used as the elastic material. For an injection molding machine which handles a resin having a relatively high melting point, the leaf plate 163 may be formed of zirconia ceramic or a like elastic material.

Through use of the leaf springs 163 as described above, stress induced in the leaf springs 63 can be made relatively small. Also, through use of the elastic material having a tempering temperature higher than the melting point of resin, the leaf springs 163 can be prevented from deteriorating in a short period of time, thereby enhancing durability of the back-flow prevention apparatus. Further, since the leaf springs 163 directly shut off communication between the groove 56 and the space located ahead of the screw 52, responsiveness of the back-flow prevention apparatus can be enhanced.

In the thus-configured back-flow prevention apparatus, in a metering step, the drive means causes the screw 52 to rotate and retreat. Resin pellets contained in the hopper drop into the heating cylinder 51 and are advanced (to the left in FIG. 6) through the groove 56. An unillustrated heater is disposed around the outer circumference of the heating cylinder 51. The heater heats the heating cylinder 51. Accordingly, resin pellets are melted while being advanced through the groove 56. The resin melt passes through the resin passageway hole 161 and causes the leaf springs 163 to bend and thus brings the leaf springs 163 into the opening state. Thus, the resin melt flows out into the space located ahead of the screw 52. Accordingly, when the screw 52 is retreated by a predetermined amount while being rotated, a predetermined amount of resin melt to be injected is stored in the space located ahead of the screw 52. In the metering step, resin pressure in the groove 56 is developed up to about 150 kgf/cm$^2$.

Upon completion of the metering step, the screw 52 is caused to stop rotating. At this time, resin pressure in the groove 56 drops and becomes substantially equal to that in the space located ahead of the screw 52. Accordingly, each leaf spring 163 is restored to the closed position by a restoring force of the urging support portion 163b. Thus, the leaf springs 163 close the resin passageway holes 161 to thereby shut off communication between the groove 56 and the space located ahead of the screw 52. That is, sealing can be completed before the start of an injection step.

In order to prevent the resin from oozing from the front end of the injection nozzle, suck-back is performed, i.e., the screw 52 is retreated a short distance without being rotated.

Next, in the injection step, the drive means is activated so as to advance the screw 52. The resin stored in the space located ahead of the screw 52 is injected into an unillustrated mold cavity from the injection nozzle, thereby filling the cavity. At this time, the resin stored in the space located ahead of the screw 52 is urged to flow rearward. However, the leaf springs 163 are already in the closed position, and thus the resin passageway holes 161 are closed, i.e., communication between the groove 56 and the space located ahead of the screw 52 is shut off. Thus, the resin stored in the space located ahead of the screw 52 can be prevented from flowing rearward.

Thus, upon completion of the metering step, the restoring force brings the leaf springs 163 to the closed position to thereby shut off communication between the groove 56 and the space located ahead of the screw 52. Accordingly, sealing can be completed before the start of the injection step. Further, timing for shutting off communication between the groove 56 and the space located ahead of the screw 52 does not vary.

Accordingly, not only can the amount of resin charged into the mold cavity be stabilized, but also variation in injection peak pressure can be halved as compared to a conventional injection peak pressure. As a result, molded products can be prevented from suffering burrs, short shot, or like defects. Also, when polyethylene is used as resin for molding, variation in weight among molded products, $\delta/X$ (mean value of x), can be made from 0.17% to 0.03%.

At the time of suck-back, the screw 52 may be retreated merely about one-third a conventional amount in order to decrease pressure around an injection nozzle to a sufficiently low value for preventing resin from oozing from the injection nozzle. Thus, there can be satisfactorily suppressed the entry of air into an injection unit associated with suck-back.

Further, since resin pressure in the space located ahead of the screw 52 can be increased to a sufficiently high level in about several tens of microseconds after the start of the injection step, the charging time is reduced. Thus, during the injection step, resin temperature is less likely to drop, and resin viscosity is less likely to increase.

Also, since breakage of sealing is completed promptly upon start of the metering step, excess heat is not generated due to plasticization of resin.

In the injection step, as the screw 52 is advanced, a reaction force induced by resin is applied to the screw head 154, causing the screw 52 to deviate from its ideal position. Accordingly, the screw 52 is pressed against the inner wall of the heating cylinder 51. As a result, galling is highly likely to occur. However, since the gap 86 is formed between the seal ring 159 and the stopper 185, between the seal ring 159 and the fitting portion 83, and between the seal ring 159 and the flange portion 84, the gap 86 absorbs such a deviation of the screw 52. Also, after such a deviation is absorbed, the seal ring 159 restricts further deviation of the screw 52. Accordingly, there can be suppressed galling which would otherwise result from the screw 52 being pressed against the inner wall of the heating cylinder 51. Further, there can be suppressed wear which would otherwise occur on an outer circumferential portion of the screw head 154. Notably, in order to improve slidableness of the seal ring 159, a labyrinth may be formed in the outer surface of the seal ring 159.

Next, a fourth embodiment of the present invention will be described.

Figure 8:
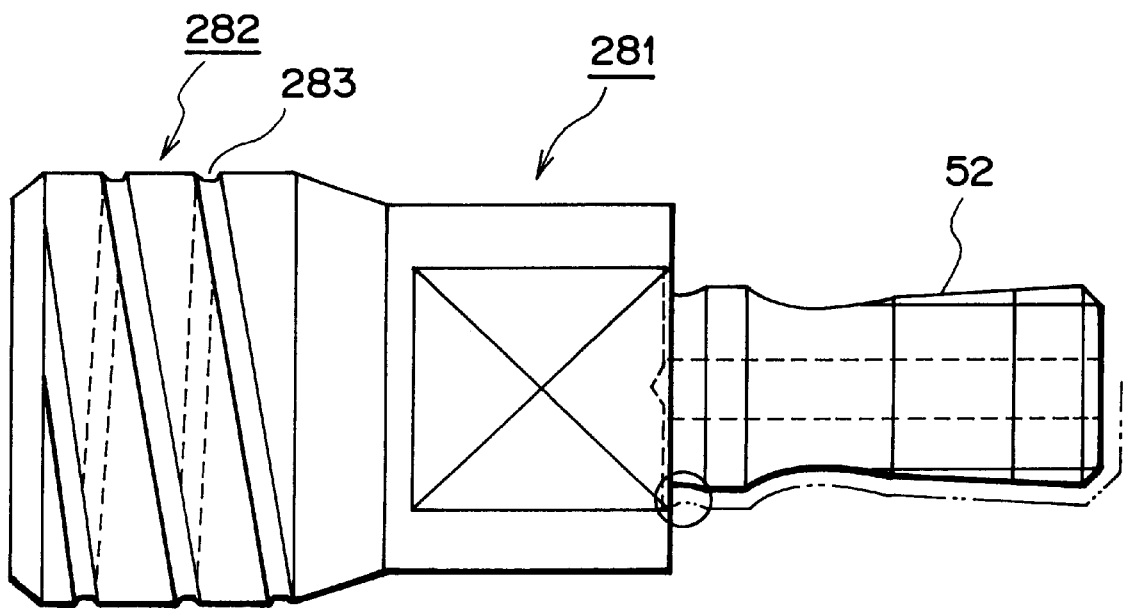
FIG. 8 is a schematic view of a head body of a back-flow prevention apparatus according to a fourth embodiment of the present invention.

FIG. 8 schematically shows a head body of a back-flow prevention apparatus according to the fourth embodiment.

In this case, reference numeral 281 denotes a head body. A seal portion 282 is formed at a front end portion (at a left end portion in FIG. 8) of the head body 281. The seal portion 282 slides on the inner wall of the heating cylinder (FIG. 6) and seals the groove 56 against a space located ahead of the screw 52. A labyrinth 283 is formed in the surface of the seal portion 282 in order to improve sliding of the seal portion 282. Accordingly, the seal portion 282 slides smoothly on the inner surface of the heating cylinder 51.

The present invention is not limited to the above-described embodiments. Numerous modifications and variations of the present invention are possible in light of the spirit of the present invention, and they are not excluded from the scope of the present invention.

What is claimed is:

1. A back-flow prevention apparatus for an injection molding machine comprising:

(a) a screw including at least a metering portion having a groove formed therein for advancing a resin into a space located ahead of said screw; and (b) a closing member in the form of a plate interposed between said groove and said space, said plate being elastically biased toward a normally closed position isolating said groove from said space and being movable to an open position by resin pressure developed behind said plate in association with metering, thereby establishing communication between said groove and said space.

2. A back-flow prevention apparatus according to claim 1, wherein said closing member is fixed on an end surface of said metering portion.

3. A back-flow prevention apparatus according to claim 1, wherein a screw head, having said closing member fixed thereto is attached onto a front end of said metering portion.

4. A back-flow prevention apparatus according to claim 1, wherein said closing member is a plate at least partially formed of an elastic material and includes a shut-off portion formed between said groove and said space located ahead of said screw, and an urging support portion integrated with said shut-off portion and adapted to urge said shut-off portion toward the closed position.

5. A back-flow prevention apparatus according to claim 1, wherein said closing member is entirely formed of an elastic material.

6. A back-flow prevention apparatus according to claim 5, wherein said closing member is a leaf spring.

7. A back-flow prevention apparatus according to claim 2, wherein in the closed position, said closing member covers a resin passageway hole formed in the front end of said metering portion.

8. A back-flow prevention apparatus according to claim 2, wherein in the closed position, said closing member covers a groove at the front end of said metering portion.

9. A back-flow prevention apparatus according to claim 3, wherein in the closed position, said closing member covers a resin passageway hole formed in the front end of said screw head.

10. A back-flow prevention apparatus according to claim 3, wherein said screw head includes a seal portion for establishing sealing between said groove and the space located ahead of said screw at a position located behind said closing member.

11. A back-flow prevention apparatus according to claim 10, wherein said screw head comprises a head body having a fitting portion, and a seal ring fit onto said fitting portion and serving as the seal portion, a gap of 10 $\mu$ to 0.5 mm being formed in an axial direction between said seal ring and said head body.

12. A back-flow prevention apparatus according to claim 1, wherein the tempering temperature of said elastic material is 400° C. or higher.

13. A back-flow prevention apparatus according to claim 10, wherein a labyrinth is formed in an outer surface of said seal portion.

14. A back-flow prevention apparatus according to claim 1 wherein said closure member is a plate having one portion fixed to a forward end of said screw and a second portion free for pivoting movement between said open and closed positions.

15. A back-flow prevention apparatus according to claim 14 wherein said closure member is a circular plate and wherein said first portion is in the center of said circular plate with said second portion of said circular plate closing said groove when in said closed position.

16. A back-flow prevention apparatus according to claim 14 wherein said first portion is an edge portion of said plate.

17. A back-flow prevention apparatus according to claim 16 wherein a linear groove is formed across one dimension of said plate, said linear groove separating said first and second portions of said plate and facilitating the bending of said second portion relative to said first portion.

18. A back-flow prevention apparatus according to claim 14 wherein said closure member is a plate fixed to said screw through a head body, to which said closure member is attached, said head body, in turn, being fixed to the forward end of said screw.

* * * * *